United States Patent
Mizoguchi

(10) Patent No.: US 11,004,002 B2
(45) Date of Patent: May 11, 2021

(54) INFORMATION PROCESSING SYSTEM, CHANGE POINT DETECTION METHOD, AND RECORDING MEDIUM

(71) Applicant: NEC CORPORATION, Tokyo (JP)

(72) Inventor: Takehiko Mizoguchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 993 days.

(21) Appl. No.: 15/539,194

(22) PCT Filed: Jan. 5, 2016

(86) PCT No.: PCT/JP2016/000014
§ 371 (c)(1),
(2) Date: Jun. 23, 2017

(87) PCT Pub. No.: WO2016/111240
PCT Pub. Date: Jul. 14, 2016

(65) Prior Publication Data
US 2018/0018570 A1    Jan. 18, 2018

(30) Foreign Application Priority Data

Jan. 7, 2015  (JP) .............................. JP2015-001270

(51) Int. Cl.
*G06N 5/04* (2006.01)
*G06N 20/00* (2019.01)
(Continued)

(52) U.S. Cl.
CPC .............. *G06N 5/04* (2013.01); *G06F 17/17* (2013.01); *G06F 17/18* (2013.01); *G06N 20/00* (2019.01)

(58) Field of Classification Search
CPC .......... G06N 5/04; G06N 20/00; G06F 17/17; G06F 17/18
See application file for complete search history.

(56) References Cited

U.S. PATENT DOCUMENTS

2004/0254760 A1   12/2004  Takeuchi et al.
2015/0160098 A1*   6/2015  Noda ................... G05B 23/024
                                                    702/35

FOREIGN PATENT DOCUMENTS

JP    2005-4658 A     1/2005
JP    2009-187293 A   8/2009

OTHER PUBLICATIONS

Bingham, Ella, Aristides Gionis, Niina Haiminen, Heli Hiisilä, Heikki Mannila, and Evimaria Terzi. "Segmentation and dimensionality reduction." In Proceedings of the 2006 SIAM International Conference on Data Mining, pp. 372-383. Society for Industrial and Applied Mathematics, 2006. (Year: 2006).*

(Continued)

*Primary Examiner* — Luis A Sitiriche
*Assistant Examiner* — Casey R. Garner

(57) ABSTRACT

Change points of a system represented by a plurality of time series are detected more appropriately. An information processing system includes means for learning, with respect to each of a plurality of time series, models that approximate partial time series respectively and are defined by parameters of the partial time series respectively, the partial time series being obtained by dividing a corresponding time series into a plurality of segments at change point candidates; and means for detecting, with respect to each of the change point candidates for the plurality of time series, a global change point that is a change point for the plurality of time series based on a difference between a parameter of a first partial time series starting from a time point of a corresponding change point candidate and a parameter of a second partial time series before the corresponding change point candidate, and outputting the global change point.

10 Claims, 12 Drawing Sheets

(51) Int. Cl.
    *G06F 17/18* (2006.01)
    *G06F 17/17* (2006.01)

(56) References Cited

OTHER PUBLICATIONS

Boyd, Stephen, Neal Parikh, and Eric Chu. Distributed optimization and statistical learning via the alternating direction method of multipliers. Now Publishers Inc, 2011. (Year: 2011).*
Guralnik et al., "Event Detection from Time Series Data," Proceedings of the Fifth ACM SIGKDD International Conference on Knowledge Discovery and Data Mining, 1999, pp. 33-42.
Harchaoui et al., "Catching Change-points with Lasso," Advances in Neural Information Processing Systems 20, 2008, pp. 617-624.
Papadimitriou et al., "Streaming Pattern Discovery in Multiple Time-Series," Proceedings of the 31st International Conference on Very Large Data Bases, 2005, pp. 697-708.
Written Opinion of the International Searching Authority for PCT/JP2016/000014, dated Apr. 12, 2016 (PCT/ISA/237).
International Search Report for PCT/JP2016/000014, dated Apr. 12, 2016 (PCT/ISA/210).

\* cited by examiner

821 GLOBAL CHANGE POINT LIST

| GLOBAL CHANGE POINT |
|---|
| 261.5074 |
| 862.5175 |
| 602.1128 |
| 406.4037 |
| 720.0437 |
| 487.8115 |
| 62.2308 |
| 133.5 |

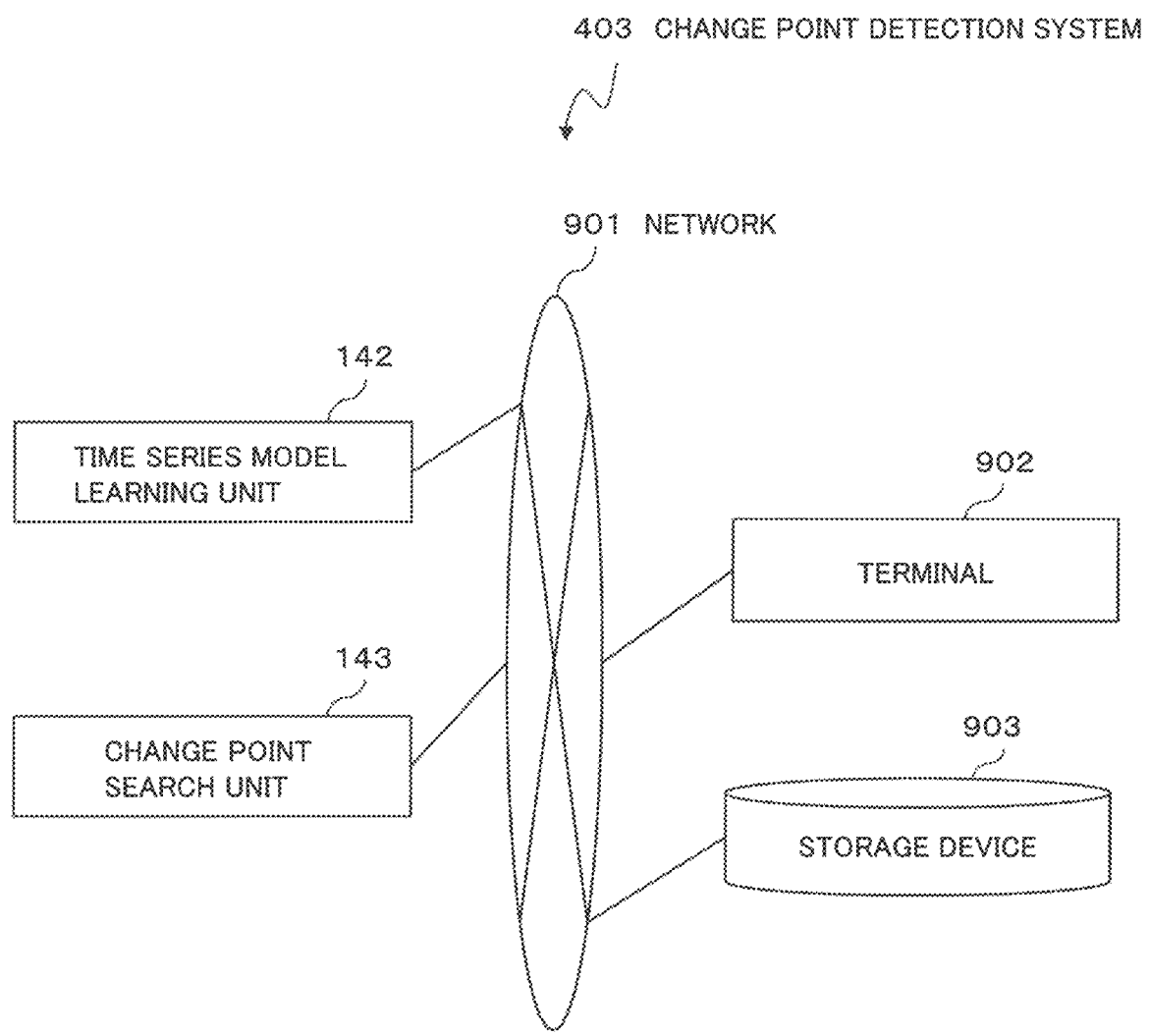

INFORMATION PROCESSING SYSTEM, CHANGE POINT DETECTION METHOD, AND RECORDING MEDIUM

CROSS REFERENCE TO RELATED APPLICATIONS

This application is a National Stage of International Application No. PCT/JP2016/000014 filed Jan. 5, 2016, claiming priority based on Japanese Patent Application No. 2015-001270, filed Jan. 7, 2015, the contents of all of which are incorporated herein by reference in their entirety.

TECHNICAL FIELD

The present invention relates to a technique for detecting a time point at which a predetermined change occurred in a time series.

BACKGROUND ART

Time series change point detection (also referred to as time series segmentation) is a technique of detecting a time point at which the trend of a time series changes substantially or a time point at which a rule to which a time series conforms changes substantially. The technique can be widely used in event detection in a plant or the like.

In general, a time series is observed with noise superposed thereon. For this reason, a method of detecting a change by tracking the values themselves of the observed time series, in many cases, does not enable a change point to be detected correctly. Therefore, a method in which using a statistical method based on regression analysis or the like, the observed time series is approximated by a smooth time series to detect a change point, has been proposed as a related art.

NPL1 discloses a technique of detecting events (change points) from a time series. In NPL1, using a method including the following first to fourth steps, a change point is detected. First, a change point candidate is set for a time series. Second, the total sum of errors (first total sum) when curve fitting (regression analysis) is applied assuming that the time series does not change at the change point candidate is calculated. Third, the total sum of errors (second total sum) when curve fitting is applied separately to segments before and after the change point candidate is calculated. Fourth, when a difference between the first total sum and the second total sum is equal to or more than a threshold value, the change point candidate is detected as a change point.

NPL2 discloses a technique of estimating change points in a one-dimensional piecewise constant signal contaminated by white noise. In NPL2, each of time series into which the signal is finely partitioned at change point candidates is fitted to a constant. Subsequently, when change in results of the fitting between segments before and after a change point candidate is equal to or more than a threshold value, the change point candidate is detected as a change point. The technique is devised to add an absolute value sum of parameters to an error function as a penalty term in such a way that, in the detection, change in results of the fitting is likely to be 0 at each change point candidate.

PTL1 discloses a change point detection device. The change point detection device in PTL1 reads in a time series momentarily, learns a parameter of the time series model successively, and calculates an error and a change point score online. The above operation enables the change point detection device in PTL1 to detect a time point at which the time series changes rapidly as a change point in real time.

CITATION LIST

Patent Literature

[PTL1] Japanese Patent Application Laid-open Publication No. 2005-004658

Non Patent Literature

[NPL1] ISBN: 1-58113-143-7, V. Guralnik and J. Srivastava, "Event Detection from Time Series Data", in Proceedings of the Fifth ACM SIGKDD International Conference on Knowledge Discovery and Data Mining, pp: 33-42, ACM Press, 1999.

[NPL2] ISBN: 9781605603520, Z. Harchaoui, C. Levy-Leduc, "Catching Change-points with Lasso", In J. C. Platt, D. Koller, Y. Singer, and S. Roweis, editors, Advances in Neural Information Processing Systems 20, pp: 617-624. MIT Press, Cambridge, Mass., 2008.

SUMMARY OF INVENTION

Technical Problem

However, in the above-described techniques described in the cited literatures, there is a problem in that, when a large-scale system represented by a plurality of time series is targeted, it is difficult to detect an overall change in the whole system, that is, the whole of the plurality of time series.

That is because, in all of the above-described techniques described in the cited literatures, it is only possible to detect change points for a single time series.

In other words, there is an issue that it is necessary to enable, in a plurality of time series, both a time point at which some time series out of the plurality of time series change and a time point at which most time series change simultaneously to be detected as change points of the whole of the plurality of time series.

An object of the present invention is to provide an information processing system, a change point detection method, and a recording medium capable of solving the above-described problem.

Solution to Problem

An information processing system according to an exemplary aspect of the present invention includes: time series model learning means for learning, with respect to each of a plurality of time series, models that approximate partial time series respectively and are defined by parameters of the partial time series respectively, the partial time series being obtained by dividing a corresponding time series into a plurality of segments at change point candidates; and change point search means for detecting, with respect to each of the change point candidates for the plurality of time series, a global change point that is a change point for the plurality of time series based on a difference between a parameter of a first partial time series starting from a time point of a corresponding change point candidate and a parameter of a second partial time series before the corresponding change point candidate, and outputting the global change point.

An change point detection method performed by a computer, according to an exemplary aspect of the present invention includes: learning, with respect to each of a plurality of time series, models that approximate partial time series respectively and are defined by parameters of the partial time series respectively, the partial time series being obtained by dividing a corresponding time series into a plurality of segments at change point candidates; and detecting, with respect to each of the change point candidates for the plurality of time series, a global change point that is a change point for the plurality of time series based on a difference between a parameter of a first partial time series starting from a time point of a corresponding change point candidate and a parameter of a second partial time series before the corresponding change point candidate, and outputting the global change point.

A computer readable storage medium according to an exemplary aspect of the present invention records thereon a program causing a computer to perform a method including: learning, with respect to each of a plurality of time series, models that approximate partial time series respectively and are defined by parameters of the partial time series respectively, the partial time series being obtained by dividing a corresponding time series into a plurality of segments at change point candidates; and detecting, with respect to each of the change point candidates for the plurality of time series, a global change point that is a change point for the plurality of time series based on a difference between a parameter of a first partial time series starting from a time point of a corresponding change point candidate and a parameter of a second partial time series before the corresponding change point candidate, and outputting the global change point.

Advantageous Effects of Invention

The present invention has an advantageous effect of being able to detect change points of a system represented by a plurality of time series more appropriately.

BRIEF DESCRIPTION OF DRAWINGS

FIG. 12 is a block diagram illustrating a configuration of a change point detection system 403 that is a variation of the second example embodiment of the present invention.

DESCRIPTION OF EMBODIMENTS

Definition of Terms

Figure 1:
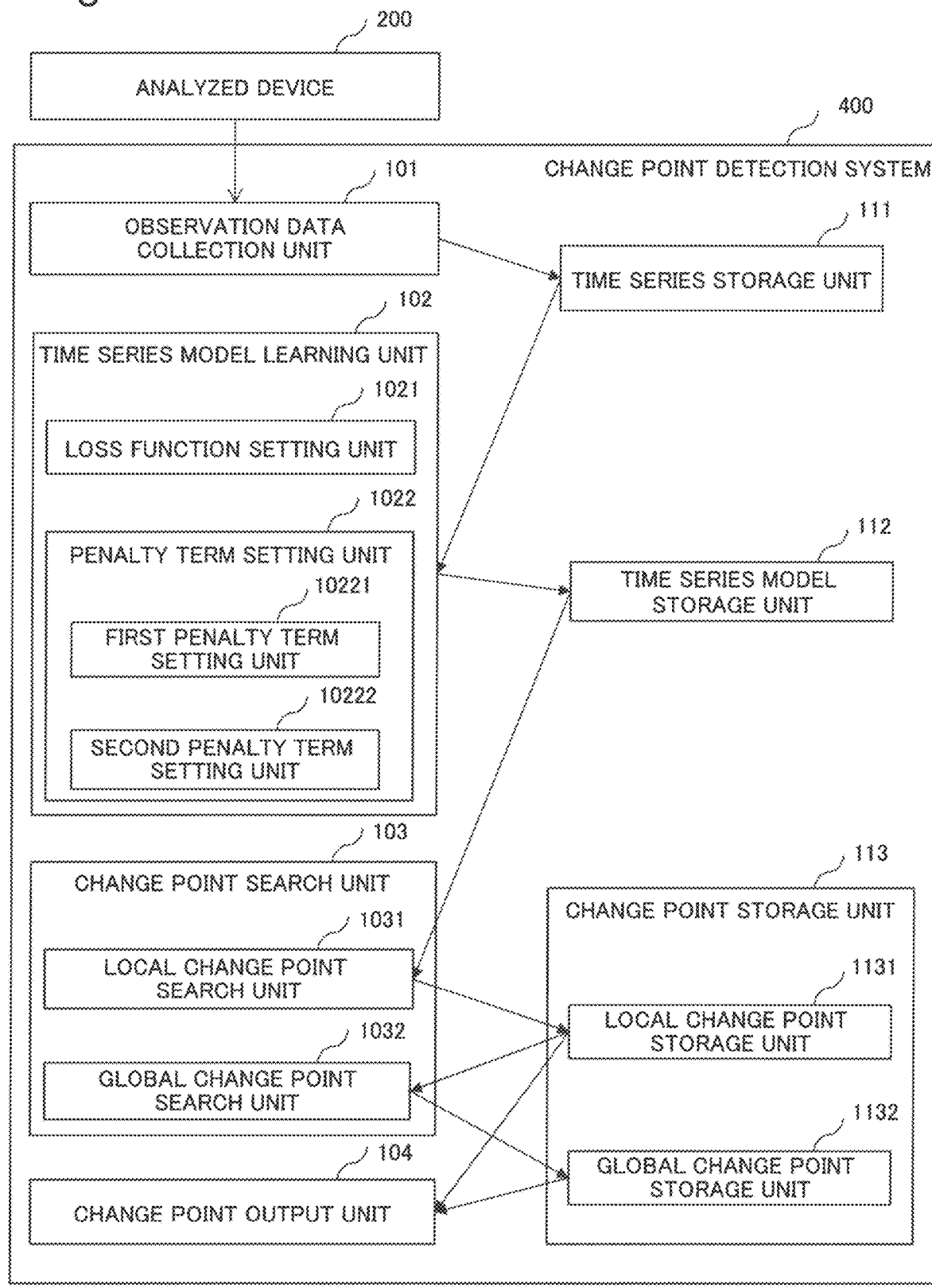
FIG. 1 is a block diagram illustrating a configuration of a change point detection system 400 in a first example embodiment of the present invention.

In the following description, a "time series" means data in which observed values are sequenced in chronological order at a constant time interval. In the above, the observed values are numerical values measured by a sensor, numerical values input in accordance with a predetermined rule, or the like. The "time series" include a wide variety of system operation statuses, such as adjusted values, temperature, pressure, gas flow rate, and voltage of an analyzed device. The "time series" also include a wide variety of evaluation indices, such as quality and yield of products, the evaluation indices being obtained as a result of operating a system under the above-described operation statuses.

A time associated with each observed value in a time series is referred to as a time point. That is, a time point is a relative time, in the time series, that is measured assuming the start time of the time series to be "0" and using the above-described constant time interval as a unit.

In the following description, a "change point" means a time point at which a value or behavior of a time series changes rapidly (exceeding a predetermined range). The "change point" involves a wide variety of changes in the value, behavior, or the like of the time series due to, for example, an artificial operation of a system, such as opening and closing of a valve and input of a material, a non-artificial state change of a system because of an unexpected failure, or the like.

First Example Embodiment

A first example embodiment of the present invention will be described in detail with reference to the drawings. The directions of arrows in the drawings only illustrate an example and do not limit the example embodiments of the present invention. In the respective drawings and the respective example embodiments described in the description, the same signs are assigned to the same constituent elements and a description thereof will be omitted appropriately. In the first example embodiment of the present invention, description will be made assuming application of a change point detection system to, for example, event detection in a chemical plant. In the first example embodiment of the present invention, description will also be made using, as an example, a case in which the number of time series subjected to detection is equal to or more than two.

FIG. 1 is a block diagram illustrating a configuration of a change point detection system (also referred to as an information processing system) 400 in the first example embodiment of the present invention. As illustrated in FIG. 1, the change point detection system 400 of the first example embodiment of the present invention is connected to an arbitrary number of analyzed devices 200. The analyzed device 200 is, for example, a device that constitutes a chemical plant.

===Analyzed Device 200===

The analyzed device 200 measures measurement values of a plurality of items relating to the analyzed device 200 itself at a constant time interval and transmits the measurement values to the change point detection system 400. As items of observed values, for example, process conditions indicating operation statuses of equipment, such as temperature, pressure, gas flow rate, and voltage, and evaluation indices, such as quality of products and yields of products, are used. Observed values are expressed in numerical values, such as integers and decimals. In addition, observed values may be expressed in symbols, such as "normal" or "abnormal", and "open" or "closed".

Figure 2:
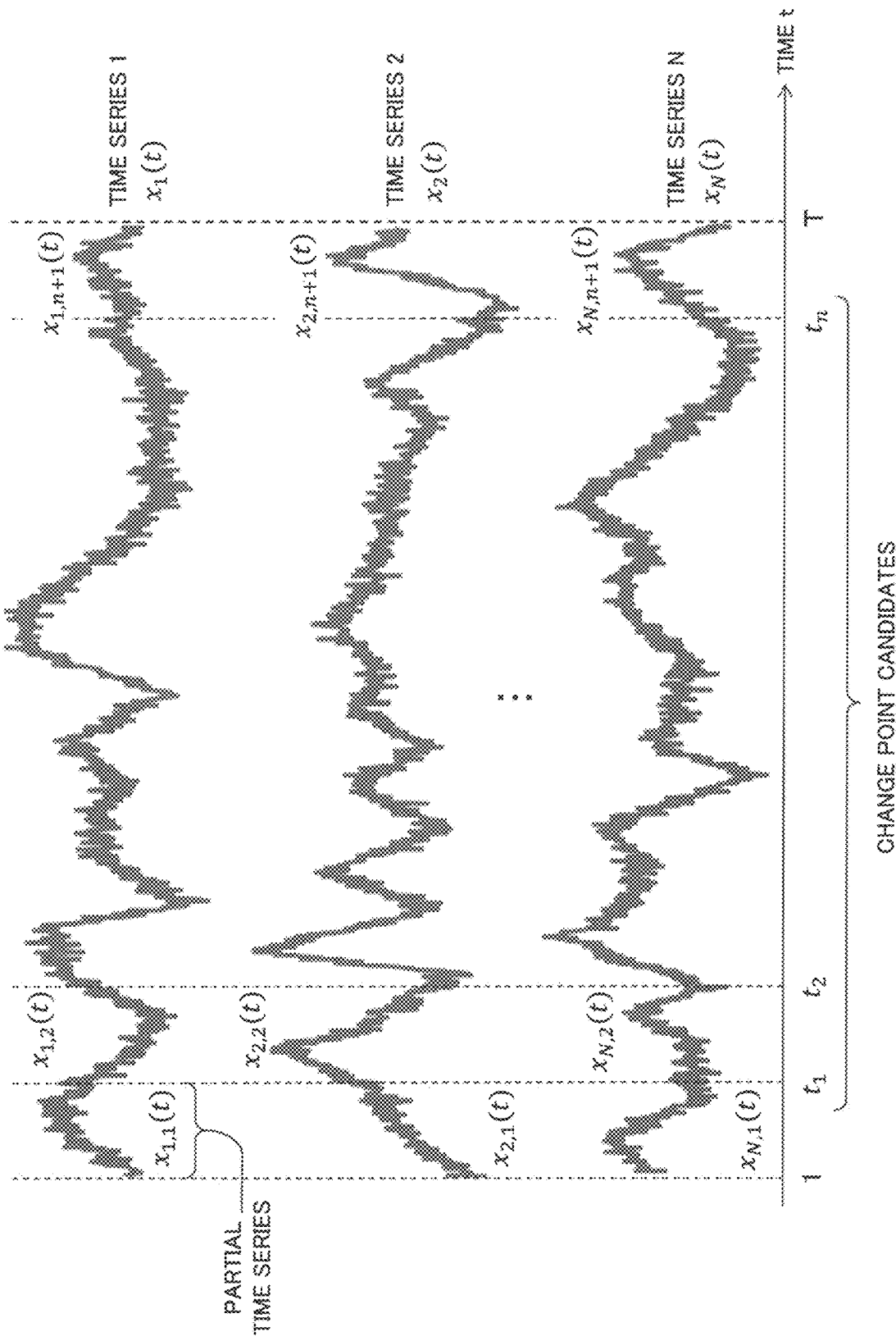
FIG. 2 is a diagram illustrating an example of a modelling procedure of a time series in the first example embodiment of the present invention.

A time series model that approximates a time series in the first example embodiment of the present invention will now be described. FIG. 2 is a diagram illustrating a modelling procedure of a plurality of time series in the first example embodiment of the present invention. In FIG. 2, a plurality of time series 1 to N that are subjected to detection of change points are illustrated. As illustrated in FIG. 2, when it is assumed that change point candidates are denoted by $t_1, t_2, \ldots, t_n$, each of the time series 1 to N is partitioned into (n+1) partial time series associated with time points 1 to $t_1$, $t_1$ to $t_2$, ..., and $t_n$ to T, respectively.

In the first example embodiment of the present invention, the following description will be made assuming that time series models each of which is defined by a parameter $\theta_i(t)$ approximate such N×(n+1) partial time series. In the parameter $\theta_i(t)$, a subscript i is a natural number of 1 to N that indicates each of the plurality of time series, and time t is a natural number of $t_1$ to T that indicates each of time points of change point candidates.

===Change Point Detection System 400===

Returning to FIG. 1, the change point detection system 400 includes an observation data collection unit 101, a time series model learning unit 102, a change point search unit 103, a change point output unit 104, a time series storage unit 111, a time series model storage unit 112, and a change point storage unit 113.

The respective constituent elements of the change point detection system 400, illustrated in FIG. 1, may be circuits corresponding to hardware units, modules included in a microchip, or components into which a computer device is divided correspondingly to functional units thereof. The following description will be made assuming that the constituent elements of the change point detection system 400, illustrated in FIG. 1, are components into which a computer device is divided correspondingly to functional units thereof. The change point detection system 400, illustrated in FIG. 1, may be installed in a server and be accessible via a network, or the respective constituent elements, illustrated in FIG. 1, may be installed in a distributed manner over a network to be accessible.

===Observation Data Collection Unit 101===

The observation data collection unit 101 acquires observed values from the analyzed device 200. The observation data collection unit 101 saves the acquired observed values in the time series storage unit 111.

===Time Series Storage Unit 111=

The time series storage unit 111 stores the observed values acquired by the observation data collection unit 101, as time series data.

===Time Series Model Learning Unit 102===

The time series model learning unit 102 reads out all the time series from the time series storage unit 111, prepares time series models that are defined by parameters, and, using an optimization algorithm, determines the parameters of the models, which approximate the respective time series. Details of the optimization algorithm will be described later.

The time series model learning unit 102 includes a loss function setting unit 1021 and a penalty term setting unit 1022.

The loss function setting unit 1021 sets a loss function to be minimized using the optimization algorithm by the time series model learning unit 102. For example, the loss function setting unit 1021 selects an arbitrary loss function out of a plurality of loss functions that have been given in advance and sets the selected loss function as a loss function to be minimized. Details of the loss function will be described later.

The penalty term setting unit 1022 sets constraint conditions (penalty terms). The constraint conditions, in addition to the above-described loss function, indicate characteristics that the parameters, which are determined by the time series model learning unit 102 using the optimization algorithm, are required to satisfy. The penalty term setting unit 1022 includes a first penalty term setting unit 10221 and a second penalty term setting unit 10222.

The first penalty term setting unit 10221 sets a first penalty term in such a way that, when the time series model learning unit 102 determines parameters, an amount of change between the parameters at each change point candidate and at the preceding or succeeding change point candidate thereof becomes equal to or less than a predetermined value (for example, substantially 0). For example, the first penalty term setting unit 10221 selects an arbitrary term that satisfies the above-described condition out of a plurality of terms that have been given in advance and sets the selected term as a first penalty term.

The second penalty term setting unit 10222 sets a second penalty term in such a way that, when the time series model learning unit 102 determines parameters, the parameters of a plurality of time series are likely to change at identical change point candidate. For example, the second penalty term setting unit 10222 selects an arbitrary term that satisfies the above-described condition out of a plurality of terms that have been given in advance and sets the selected term as a second penalty term.

===Time Series Model Storage Unit 112===

The time series model storage unit 112 saves the parameters, which have been determined by the time series model learning unit 102 and define the time series models.

===Change Point Search Unit 103===

The change point search unit 103 searches for local change points for respective single time series and global change points for the whole of a plurality of time series. The change point search unit 103 includes a local change point search unit 1031 and a global change point search unit 1032.

The local change point search unit 1031 detects local change points with respect to each of the time series 1 to N in a manner described below. First, the local change point search unit 1031, with respect to a time series (any of the time series 1 to N), reads out parameters that define time series models of the time series from the time series model storage unit 112. Next, the local change point search unit 1031 compares the value of a parameter of a partial time series having a starting point at each change point candidate of the time series with the value of a parameter of another partial time series before the partial time series. When a result from the comparison exceeds a predetermined threshold value, the local change point search unit 1031 detects the change point candidate as a local change point. The local change point search unit 1031 saves the detected local change points in a local change point storage unit 1131.

The global change point search unit 1032 reads out local change points with respect to all the time series 1 to N from the local change point storage unit 1131 and, on the basis of the read-out local change points, detects global change points. The global change point search unit 1032 saves the detected global change points in a global change point storage unit 1132.

The change point storage unit 113 stores the local change points and global change points that are detected by the change point search unit 103. The change point storage unit 113 includes the local change point storage unit 1131 and the global change point storage unit 1132.

The local change point storage unit 1131 stores local change points that are detected by the local change point search unit 1031.

The global change point storage unit 1132 stores global change points that are detected by the global change point search unit 1032.

===Change Point Output Unit 104===

The change point output unit 104 reads out local change points from the local change point storage unit 1131 and outputs local change points for each of the time series 1 to N. In addition, the change point output unit 104 reads out global change points from the global change point storage unit 1132 and outputs the global change points for the whole of the time series 1 to N.

The change point output unit 104 may output information indicating, with respect to each global change point, how and which time series causes a change point candidate (time point) to be detected as the global change point in conjunction with the global change points. Such information is, for example, information indicating that change in a specific time series is greater than a predetermined value. Such information may also be information indicating that change in each of a plurality of specific time series is greater than a predetermined value associated with a corresponding one of the plurality of specific time series.

The change point detection system 400 in the first example embodiment of the present invention is, for example, achieved by a CPU (Central Processing Unit) that executes processing in accordance with a program. The change point detection system 400 may also be achieved by a computer that includes a CPU and a storage medium storing a program and operates by means of control performed by the CPU in accordance with the program.

The observation data collection unit 101, the time series model learning unit 102, the change point search unit 103, and the change point output unit 104 are, for example, achieved by a CPU that executes processing in accordance with programmed control.

The time series storage unit 111, the time series model storage unit 112, and the change point storage unit 113 are achieved by, for example, RAM (Random Access Memory). The time series storage unit 111, the time series model storage unit 112, and the change point storage unit 113 may be configured with a storage medium or a plurality of storage media.

Figure 3:
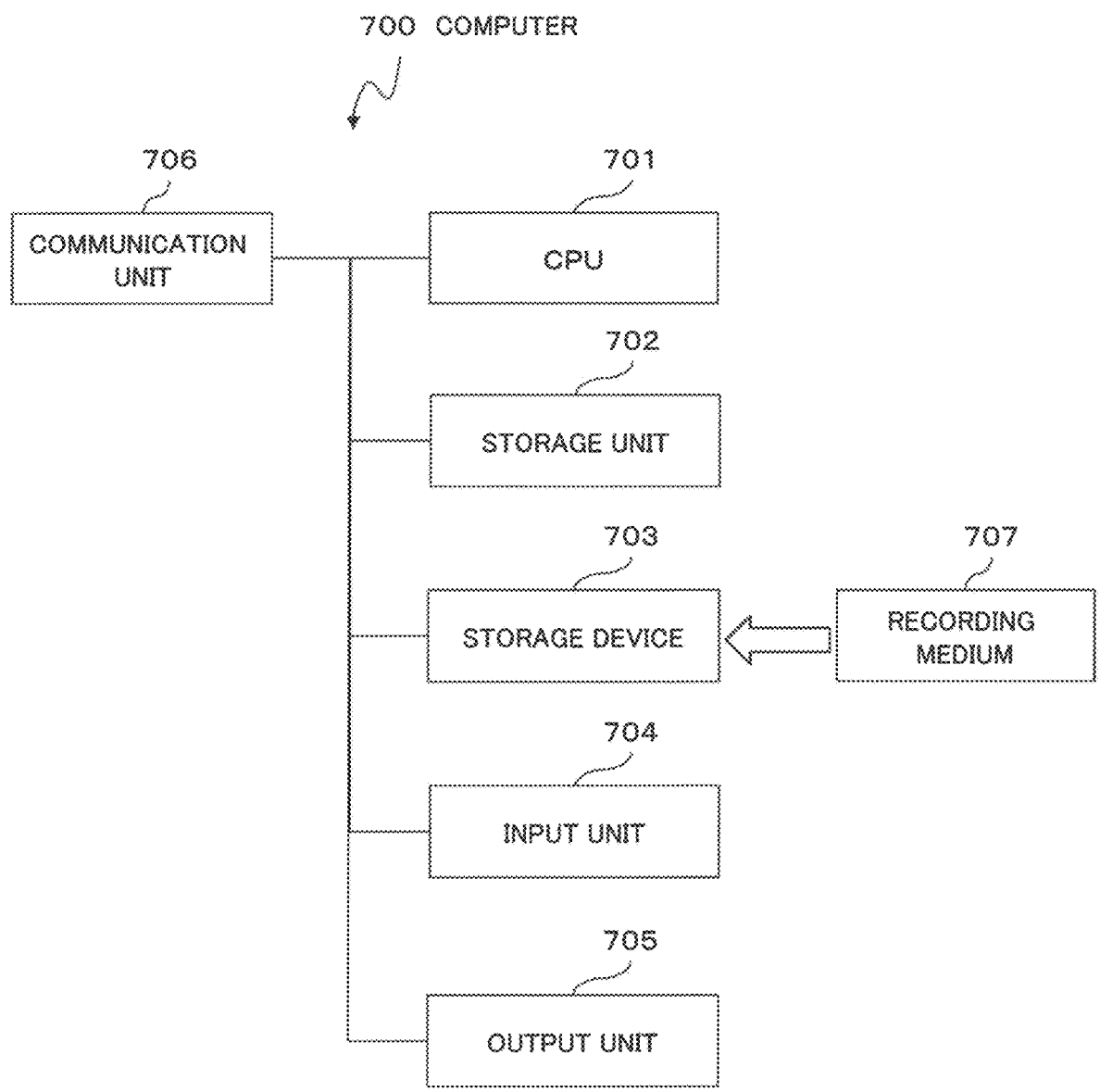
FIG. 3 is a block diagram illustrating a hardware configuration of a computer 700 that achieves the change point detection system 400 in the first example embodiment of the present invention.

FIG. 3 is a diagram illustrating a hardware configuration of a computer 700 that achieves the change point detection system 400 in the first example embodiment of the present invention.

As illustrated in FIG. 3, the computer 700 includes a CPU 701, a storage unit 702, a storage device 703, an input unit 704, an output unit 705, and a communication unit 706. Further, the computer 700 includes a recording medium (or storage medium) 707 that is provided from the outside and is mounted to the storage device 703. For example, the recording medium 707 is a non-volatile recording medium (non-transitory recording medium) that stores information in a non-transitory manner. The recording medium 707 may also be a transitory recording medium that retains information as a signal.

The CPU 701 starts up an operating system (not illustrated) and controls an operation of the whole of the computer 700. For example, the CPU 701 reads out a program and data from the recording medium 707, which is mounted to the storage device 703, and writes the read-out program and data in the storage unit 702. In the above, the program is, for example, a program for making the computer 700 execute an operation in a flowchart illustrated in FIG. 4, which will be described later.

The CPU 701 executes various processing, in accordance with the read-out program and on the basis of the read-out data, as the observation data collection unit 101, the time series model learning unit 102, the change point search unit 103, and the change point output unit 104, which are illustrated in FIG. 1.

The CPU 701 may download the program and the data from an external computer (not illustrated) connected to a communication network (not illustrated) into the storage unit 702.

The storage unit 702 stores the program and the data. The storage unit 702 may include the time series storage unit 111, the time series model storage unit 112, and the change point storage unit 113.

The recording medium 707 mounted to the storage device 703 is, for example, an optical disc, a flexible disk, a magneto optical disk, an external hard disk, a semiconductor memory, or the like. The recording medium 707 stores the program in a computer-readable manner. The recording medium 707 may also store the data. The recording medium 707 may include the time series storage unit 111, the time series model storage unit 112, and the change point storage unit 113. The storage device 703 performs reading-out of the program and the data from the recording medium 707 and writing of the program and the data to the recording medium 707. The storage device 703 may also store the program and the data, which are read out from the recording medium 707.

The input unit 704 accepts input, by an operator, of operations and input of information from the outside. The devices used for the input operation includes, for example, a mouse, a keyboard, a built-in key button, a touch panel, and the like. The input unit 704 may be included in the observation data collection unit 101 and the change point output unit 104 as a portion thereof.

The output unit 705 is achieved by, for example, a display. The output unit 705 is used for, for example, an input request to the operator, output presentation to the operator, and the like by use of a GUI (Graphical User Interface). The output unit 705 may be included in the change point output unit 104 as a portion thereof.

The communication unit 706 achieves, for example, an interface with the analyzed device 200. The communication unit 706 may be included in the observation data collection unit 101 as a portion thereof. The communication unit 706 may further achieve an interface with another external device.

As described thus far, the respective constituent elements corresponding to the functional units of the change point detection system 400, illustrated in FIG. 1, are achieved by the computer 700 having the hardware configuration illustrated in FIG. 3. However, means for achieving the respective units included in the computer 700 are not limited to the above-described means. That is, the computer 700 may be achieved by a single device physically-coupled or may be achieved by a plurality of devices that are two or more physically-separated devices interconnected in a wired or wireless manner.

When the recording medium 707 storing the codes of the above-described programs is provided to the computer 700, the CPU 701 may read out and execute the codes of the program contained in the recording medium 707. Alternatively, the CPU 701 may store the codes of the program contained in the recording medium 707 into the storage unit 702, the storage device 703, or both thereof. That is, the first example embodiment of the present invention includes an example embodiment of the recording medium 707 storing, in a transitory or non-transitory manner, the program (software) executed by the computer 700 (the CPU 701). A storage medium storing information in a non-transitory manner is also referred to as a non-volatile storage medium.

The above is a description of the respective constituent elements corresponding to hardware units of the computer 700, which achieves the change point detection system 400 in the first example embodiment of the present invention.

Next, the operation of the first example embodiment of the present invention will be described in detail with reference to the drawings.

Figure 4:
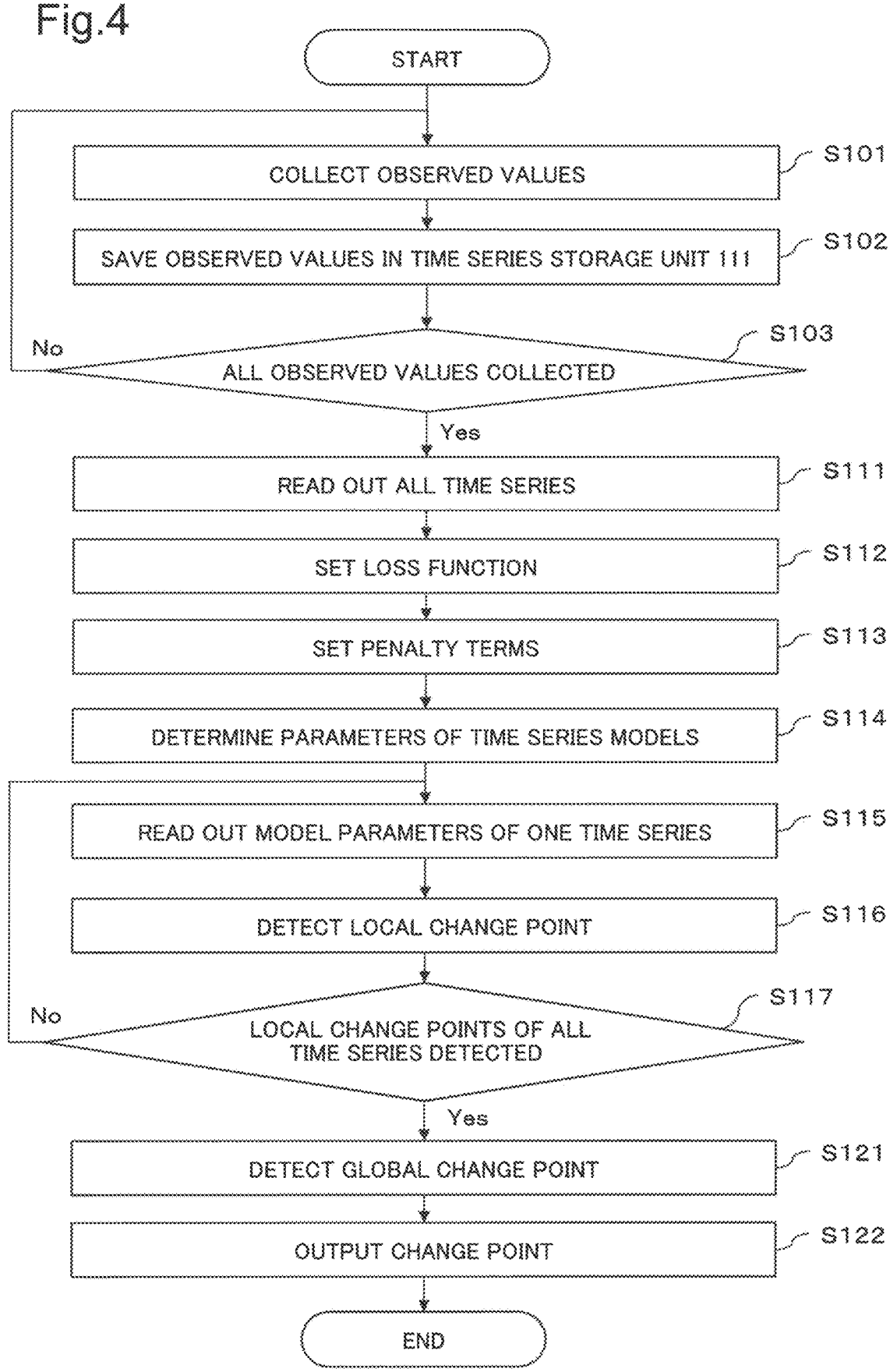
FIG. 4 is a flowchart illustrating operation of the change point detection system 400 in the first example embodiment of the present invention.

FIG. 4 is a flowchart illustrating the operation of the change point detection system 400 in the first example embodiment of the present invention. The process illustrated in the flowchart may be executed in accordance with the afore-described programmed control performed by the CPU 701. The names of process steps are indicated by symbols, such as S101.

The change point detection system 400 starts the operation in the flowchart, illustrated in FIG. 4, for example, at a predetermined time. The change point detection system 400 may also start the operation in the flowchart, illustrated in FIG. 4, triggered by accepting an instruction from the operator via the input unit 704, illustrated in FIG. 3. The change point detection system 400 may start the operation in the flowchart, illustrated in FIG. 4, triggered by receiving a request from the outside via the communication unit 706, illustrated in FIG. 3.

The observation data collection unit 101 in the change point detection system 400 collects observed values from the analyzed device 200 (step S101).

The observation data collection unit 101 saves the collected observed values as time series in each of which the observed values are sequenced in chronological order in the time series storage unit 111 (step S102).

The observation data collection unit 101 confirms whether or not all the observed values have been collected from the analyzed device 200 (step S103). When an observed value that has not been collected is left (No in step S103), the observation data collection unit 101 repeats the processing from step S101. When all the observed values have been collected (Yes in step S103), the process proceeds to step S111.

When all the observed values have been collected (Yes in step S103), the time series model learning unit 102 reads out all the time series saved in the time series storage unit 111 (step S111).

Next, the loss function setting unit 1021 in the time series model learning unit 102 sets a loss function for learning (calculating) parameters that define time series models (step S112).

Next, the penalty term setting unit 1022 sets penalty terms (a first penalty term and a second penalty term) for defining characteristics to be satisfied by the parameters (step S113).

Next, the time series model learning unit 102 solves an optimization problem that is formulated by means of the loss function set by the loss function setting unit 1021 and the penalty terms set by the penalty term setting unit 1022, using an optimization algorithm. Through the above processing, the time series model learning unit 102 determines the parameters of time series models that approximate the read-out time series (step S114). The time series model learning unit 102 saves the determined parameters in the time series model storage unit 112.

Next, the local change point search unit 1031 reads out the parameters, which have been determined in step S114, of time series models corresponding to one time series from the time series model storage unit 112 (step S115).

Next, the local change point search unit 1031 calculates an amount of change between a parameter of a partial time series that has a starting point at each change point candidate and a parameter of another partial time series before the partial time series. Subsequently, the local change point search unit 1031 detects a change point candidate(s) at which the calculated amount(s) of change (when there are a plurality of parameters, the absolute value sum of the amounts of change in the parameters) exceed(s) a predetermined threshold value as a local change point(s) (step S116). At this time, the local change point search unit 1031 saves the detected local change point(s) in the local change point storage unit 1131.

Next, the local change point search unit 1031 confirms whether or not detection of a local change point(s) has been performed with respect to all the time series 1 to N (step S117). When, in the time series 1 to N, a time series for which detection of a local change point(s) has not been performed is included (No in step S117), the local change point search unit 1031 repeats the processing from step S115. When detection of a local change point(s) has been performed with respect to all the time series 1 to N (Yes in step S117), the process proceeds to step S121.

When detection of a local change point(s) has been performed with respect to all the time series (Yes in step S117), the global change point search unit 1032 reads out all the local change points that are saved in the local change point storage unit 1131. Subsequently, the global change point search unit 1032 detects a time point(s) at which read-out local change points concentrate as a global change point(s) (step S121). The global change point search unit 1032 saves the detected global change point(s) in the global change point storage unit 1132.

Next, the change point output unit 104 reads out the global change point(s) that is/are saved in the global change point storage unit 1132, and outputs the read-out global change point(s) as a change point(s) (step S122).

For example, the change point output unit 104 outputs the change point(s) via the output unit 705, illustrated in FIG. 3. The change point output unit 104 may also transmit the change point(s) to a not-illustrated device via the communication unit 706, illustrated in FIG. 3. The change point output unit 104 may also record the change point(s) in the recording medium 707 via the storage device 703, illustrated in FIG. 3.

Consequently, the change point detection system 400 of the first example embodiment of the present invention finishes the processing.

In the first example embodiment of the present invention, the number of change point candidates may be set at a number fewer than the number T of all time points. That is, the number of change point candidates may be set at any number as long as the number is one to the number of all time points. Intervals between change point candidates may be equal or unequal.

In the first example embodiment of the present invention, any model may be used as a time series model used by the time series model learning unit 102 for approximating a time series. As a model for approximating a partial time series in each segment, for example, an AR (Auto Regressive) model may be used.

In the first example embodiment of the present invention, any function may be used as a loss function as long as it is possible to evaluate the approximation accuracy of a time series model. When it is assumed that a value in an actual time series is denoted by $x_i(t)$ and an approximate value obtained using a time series model is denoted by $x'_i(t)$, for example, a square error $(x'_i(t)-x_i(t))^2$ may be used as a loss function. In the above, the subscript i may be a natural number of 1 to N that indicates each of a plurality of time series, and the time t may be a natural number of 1 to T (the maximum value of the time points) that indicates each time point. The time t may also be a natural number of 1 to T (the maximum value of the time points of change point candidates) that indicates each of the time points of change point candidates.

In the first example embodiment of the present invention, any term may be used as a first penalty term as long as, as the value of the penalty term decreases, amounts of change in parameters at the respective change point candidates become sparse (most are 0 or values close to 0) with respect to the whole of change point candidates. For example, the parameters of time series models for a time series i is denoted by a vector $\theta_i=[\theta_i(t_1), \theta_i(t_2), \ldots, \theta_i(t_n), \theta_i(T)]$. As a first penalty term, the absolute value sum (L1 norm) $\Sigma|\theta_i(t_k)-\theta_i(t_{k-1})|$ of the respective elements in a vector $[\theta_i(t_2)-\theta_i(t_1), \theta_i(t_3)-\theta_i(t_2), \ldots, \theta_i(T)-\theta_i(t_n)]$ in which amounts of change between adjacent parameters are arranged is defined. In the above, the subscript k is a natural number, and the absolute value sum is the sum of amounts of change over k=2 to k=n+1 (where $t_{n+1}=T$). In this case, since, as the value of the absolute value sum decreases, the values of $\theta_i(t_k)-\theta_i(t_{k-1})$ become 0 or close to 0 for more values of k, the absolute value sum may be used as a first penalty term.

In the first example embodiment of the present invention, any term may be used as a second penalty term as long as, as the value of the penalty term decreases, the parameters $\theta_i(t)$ of a plurality of time series become likely to change at the same change point candidate.

Furthermore, in the first example embodiment of the present invention, any algorithm may be used as an optimization algorithm used by the time series model learning unit 102 for learning time series models, as long as the minimization problem in the first example embodiment of the present invention can be solved. In the above, the minimization problem in the first example embodiment of the present invention is a minimization problem that is formulated by the loss function setting unit 1021, the first penalty term setting unit 10221, and the second penalty term setting unit 10222.

The first example embodiment of the present invention may be applied to any analyzed device and analyzed system from which a plurality of sets of operation information can be obtained.

For example, the analyzed system may be an IT (Information Technology) system, a structure, transportation equipment, or the like. In the case of an IT system, as operation information, a usage rate and used amount of computer resources, such as a CPU utilization rate, a memory usage rate, and disk access frequency, a usage rate and used amount of communication network resources, a performance index, such as power consumption and the number of arithmetic operations are used.

A first advantageous effect in the first example embodiment of the present invention resides in that change points of a system represented by a plurality of time series can be detected more appropriately. Specifically, the change point detection system 400 of the first example embodiment of the present invention may detect, as change points, both time points at which some time series change substantially and time points at which most time series change.

That is because the time series model learning unit 102 determines parameters $\theta_i(t)$ of models that approximate time series, and the change point search unit 103, on the basis of the determined parameters $\theta_i(t)$, searches for local change points corresponding to respective single time series and global change points corresponding to the whole of a plurality of time series.

A second advantageous effect of the first example embodiment of the present invention resides in that information that is more suitable for users taking countermeasures against global change points may be output.

That is because the change point output unit 104 outputs information indicating, with respect to each global change point, how and which time series caused a change point candidate (time point) to be detected as the global change point in conjunction with the global change points.

EXAMPLE

Next, an example of the first example embodiment of the present invention will be described in detail with reference to the drawings. Hereinafter, unless the description of the example is obscured, descriptions of portions overlapping the earlier description will be omitted.

Figure 5:
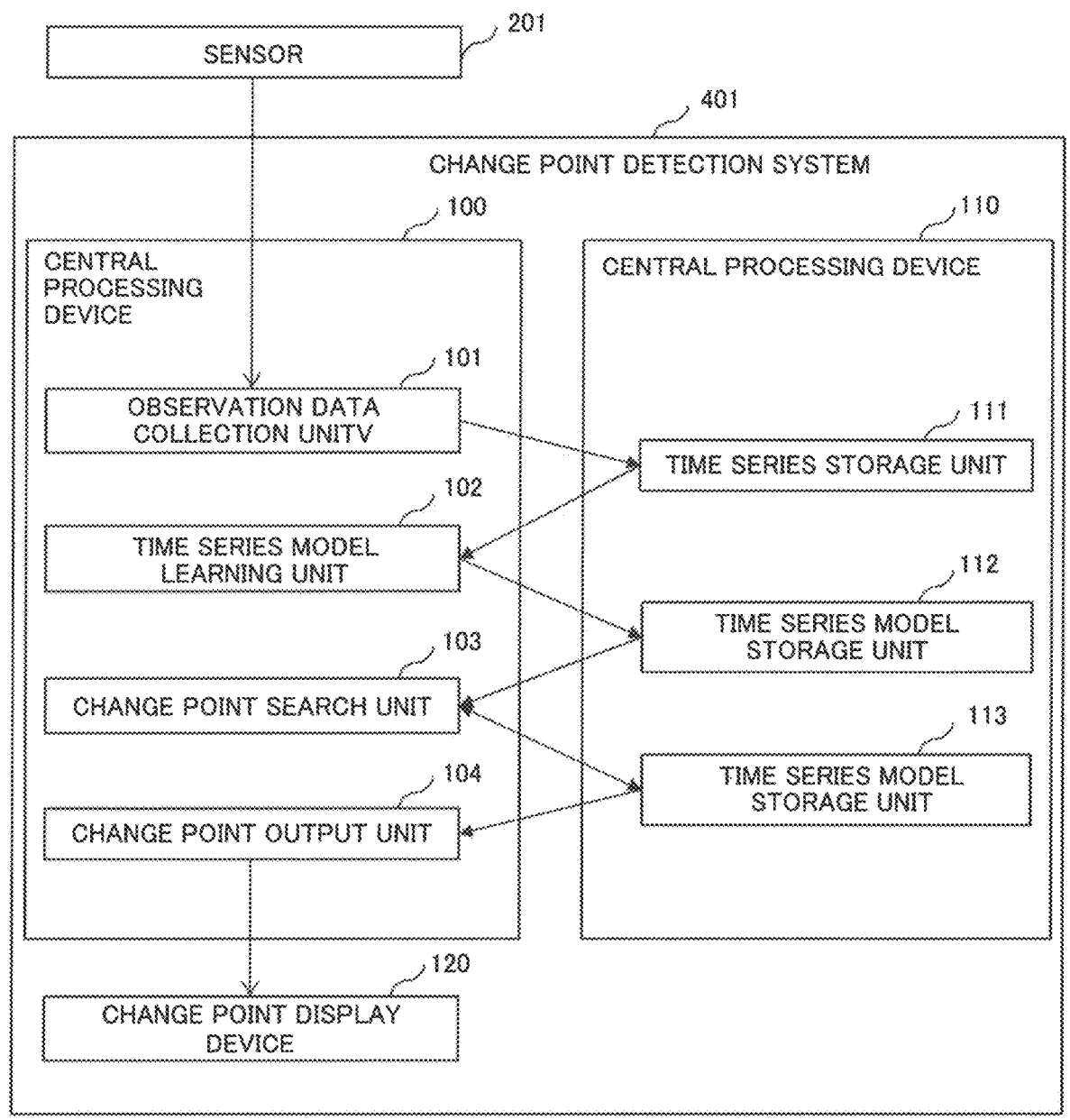
FIG. 5 is a block diagram illustrating a configuration of an information processing system that includes a change point detection system 401 in an example of the first example embodiment of the present invention.

FIG. 5 is a block diagram illustrating a configuration of an information processing system that includes a change point detection system 401 in the example of the first example embodiment of the present invention. As illustrated in FIG. 5, the change point detection system 401 is, for example, connected to any sensors 201 that are used in a plant (not illustrated).

As illustrated in FIG. 5, the change point detection system 401 includes a central processing device 100, a storage device 110, and a change point display device 120.

The central processing device 100 includes an observation data collection unit 101, a time series model learning unit 102, a change point search unit 103, and a change point output unit 104. The observation data collection unit 101, the time series model learning unit 102, the change point search unit 103, and the change point output unit 104 are respectively the same as the observation data collection unit 101, the time series model learning unit 102, the change point search unit 103, and the change point output unit 104 that are illustrated in FIG. 1.

The storage device 110 includes a time series storage unit 111, a time series model storage unit 112, and a change point storage unit 113. The time series storage unit 111, the time series model storage unit 112, and the change point storage unit 113 are respectively the same as the time series storage unit 111, the time series model storage unit 112, and the change point storage unit 113 that are illustrated in FIG. 1.

The change point display device 120 displays, in such a form that users easily interpret, change point information outputted by the change point output unit 104.

Next, examples of a time series model learning method and a change point detection method in the example will be described specifically with reference to FIGS. 6 to 9. Data illustrated in FIGS. 6 to 9 are based on results from numerical calculation that was actually carried out.

First, the operation of learning time series models from time series will be described specifically.

Figure 6:
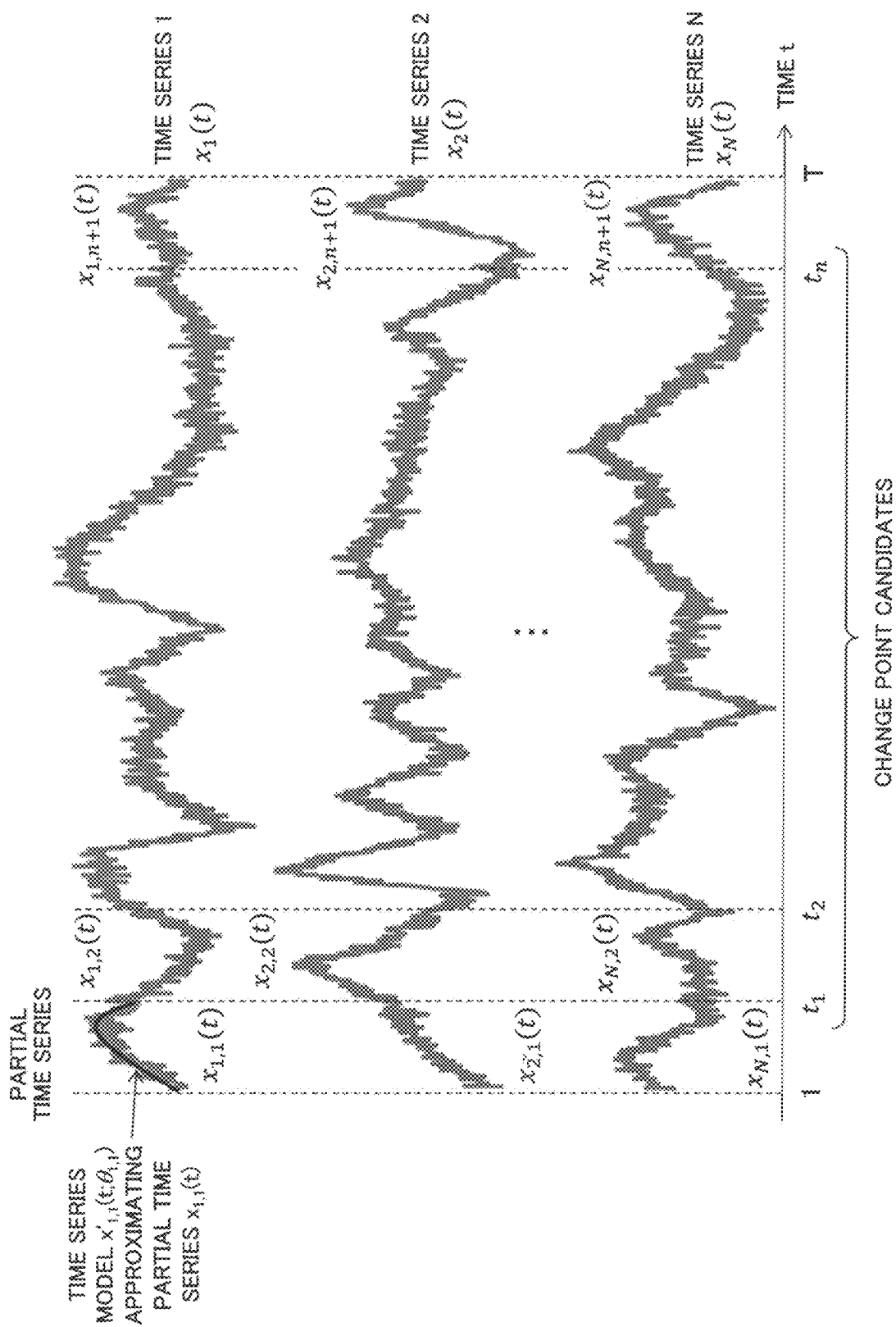
FIG. 6 is a diagram illustrating an example of a time series modelling method in the example of the first example embodiment of the present invention.

FIG. 6 is a diagram illustrating an example of a time series modelling method for change point detection performed by the time series model learning unit 102 in the example of the first example embodiment of the present invention. In FIG. 6, time series 1 to N that are subjected to modelling, change point candidates $t_1$ to $t_n$, and an example of a time series model ($x'_{1,1}(t; \theta_{1,1})$ in the drawing) for a partial time series ($x_{1,1}(t)$ in the drawing) are illustrated. In the above, the partial time series is a time series corresponding to one of segments partitioned at change point candidates.

For example, as illustrated in FIG. 6, the time series model learning unit 102 partitions each time series into n+1 segments 1 to $t_1$, $t_1$ to $t_2$, . . . , and $t_n$ to T using change point candidates $t_1$, $t_2$, . . . , and $t_n$. Through this partitioning, the time series model learning unit 102 obtains N×(n+1) partial time series in total with regard to all the time series.

The time series model learning unit 102 prepares a time series model for every one of these partial time series, and determines parameters $\theta_i(t)$ of the time series models. A parameter that defines a time series model for a partial time series $x_{i,k}(t)$ of a time series i over a segment $t_{k-1}$ to $t_k$ is now denoted by $\theta_{i,k}$. The parameter $\theta_{i,k}$ may take both a scalar form and a vector form depending on the prepared time series model. The time series models $x'_{i,k}(t)$ used by the time series model learning unit 102 include a constant ($x'_{i,k}(t)=\theta_{i,k}$), a straight line ($x'_{i,k}(t)=\theta^{(1)}_{i,k}t+\theta^{(2)}_{i,k}$) an AR model ($x'_{i,k}(t)=\theta^{(1)}_{i,k}x_{i,k}(t-1)+\theta^{(2)}_{i,k}x_{i,k}(t-2)+ \ldots +\theta^{(m)}_{i,k}x_{i,k}(t-m)$), or the like. In the above, $\theta^{(1)}_{i,k}, \theta^{(2)}_{i,k}, \ldots$ are elements constituting the parameter $\theta_{i,k}$ and are defined in accordance with the form of the time series model. For example, when an AR model is employed, $\theta^{(1)}_{i,k}, \theta^{(2)}_{i,k}, \ldots$ are coefficients to be multiplied on the values of the time series at t−1, t−2, . . . , respectively.

Hereinafter, to simplify a description, the parameter $\theta_{i,k}$ is assumed to be a scalar, and approximations of a partial time series $x_{i,k}(t)$ by a time series model defined by $\theta_{i,k}$ are denoted by $x'_{i,k}(t; \theta_{i,k})$.

The loss function setting unit 1021 sets a loss function for evaluating an approximation accuracy of a time series model. For example, when a square error is used as a loss function, a square error of a time series i over a segment $t_{k-1}$ to $t_k$ can be expressed by Math. 1.

$$\sum_{t=t_{k-1}}^{t_k} (x'_{i,k}(t; \theta_{i,k}) - x_{i,k}(t))^2 \qquad [\text{Math. 1}]$$

The square error is expressed by Math. 2 that is the sum of values expressed by Math. 1 over all the segments and time series thereover.

$$\sum_{i=1}^{N} \sum_{k=1}^{n+1} \sum_{t=t_{k-1}}^{t_k} (x'_{i,k}(t; \theta_{i,k}) - x_{i,k}(t))^2 \qquad [\text{Math. 2}]$$

The loss function setting unit 1021 sets Math. 2 as an objective function (loss function) to be minimized by the time series model learning unit 102.

The first penalty term setting unit 10221 sets a first penalty term in such a way that most amounts of change $\theta_{i,k}-\theta_{i,k-1}$, in the parameter $\theta_{i,k}$, between adjacent change point candidates take 0 or values close to 0 with respect to the whole of change point candidates of the respective time series. For example, the first penalty term setting unit 10221 uses, as a penalty term that has such characteristics, the absolute value sum (L1 norm) of the respective elements in a vector $[\theta_{i,2}-\theta_{i,1}, \theta_{i,3}-\theta_{i,2}, \ldots \theta_{i,n+1}-\theta_{i,n}]$ made up of amounts of change in parameters, as expressed by Math. 3.

$$\sum_{k=2}^{n+1} |\theta_{i,k} - \theta_{i,k-1}| \qquad [\text{Math. 3}]$$

In this case, Math. 4 that is the sum of values expressed by Math. 3 over all the time series expresses the first penalty term. The first penalty term setting unit 10221 sets Math. 4 as the first penalty term.

$$\sum_{i=1}^{N} \sum_{k=2}^{n+1} |\theta_{i,k} - \theta_{i,k-1}| \qquad [\text{Math. 4}]$$

The second penalty term setting unit 10222 sets a second penalty term in such a way that the value of the penalty term becomes smaller in the case the parameters $\theta_{i,k}$ of a plurality of time series change at an identical change point candidate than in the case the parameters $\theta_{i,k}$ of the plurality of time series change at different change point candidates. For example, the second penalty term setting unit 10222 uses Math. 5 as a penalty term that has such characteristics.

$$\sum_{k=2}^{n+1} \sqrt{\sum_{i=1}^{N} (\theta_{i,k} - \theta_{i,k-1})^2} \qquad [\text{Math. 5}]$$

When the total numbers of change points are the same, the value of the penalty term becomes smaller in the case the parameters change at the same point than otherwise. When, for simplicity reason, it is assumed that both the number n of change point candidates and the number N of time series are two, Math. 5 can be expressed as Math. 6.

[Math. 6]

$$\sqrt{(\theta_{1,2}-\theta_{1,1})^2+(\theta_{2,2}-\theta_{2,1})^2}+\sqrt{(\theta_{1,3}-\theta_{1,2})^2+(\theta_{2,3}-\theta_{2,2})^2}$$

In this case, when both the parameter of the time series 1 and the parameter of the time series 2 change by 1 at only the change point candidate $t_2$, $|\theta_{1,2}-\theta_{1,1}|=|\theta_{2,2}-\theta_{2,1}|=1$ holds and the value of Math. 6 is $\sqrt{2}$. On the other hand, when the parameter of the time series 1 changes by 1 at only $t_2$ and the parameter of the time series 2 changes by 1 at only $t_3$, the value of Math. 6 is 2. On the basis of the above calculation, it becomes evident that, even when the total amounts of change in parameters are the same, a parameter $\theta_{i,k}$ that changes at the same candidate point is likely to be chosen in the model learning process because of the penalty term expressed by Math. 5. The second penalty term setting unit 10222 sets Math. 5 as the second penalty term.

The time series model learning unit 102 learns parameters $\theta_{i,k}$ in such a way as to minimize Math. 7, which is the sum of the loss function (Math. 2), the first penalty term (Math. 4), and the second penalty term (Math. 5).

$$\sum_{i=1}^{N} \sum_{k=1}^{n+1} \sum_{t=t_{k-1}}^{t_k} (x'_{i,k}(t; \theta_{i,k}) - x_{i,k}(t))^2 + \qquad [\text{Math. 7}]$$

$$\sum_{i=1}^{N} \sum_{k=2}^{n+1} |\theta_{i,k} - \theta_{i,k-1}| + \sum_{k=2}^{n+1} \sqrt{\sum_{i=1}^{N} (\theta_{i,k} - \theta_{i,k-1})^2}$$

When a constant, a straight line, or an AR model is used as a time series model, the parameters $\theta_{i,k}$ that minimize Math. 7 can be numerically obtained by using, for example, an alternating direction method of multipliers (ADMM), which is a well-known optimization algorithm.

Next, the change point detection operation performed by the change point search unit 103 will be described specifically.

As described above, the parameters $\theta_{i,k}$ for all i=1 to N and k=1 to n+1 have been determined by the time series model learning unit 102. Therefore, the time series model storage unit 112, for each time series, retains (n+1) parameters $\theta_{i,k}$ with respect to the respective partial time series partitioned at change point candidates.

Figure 7:
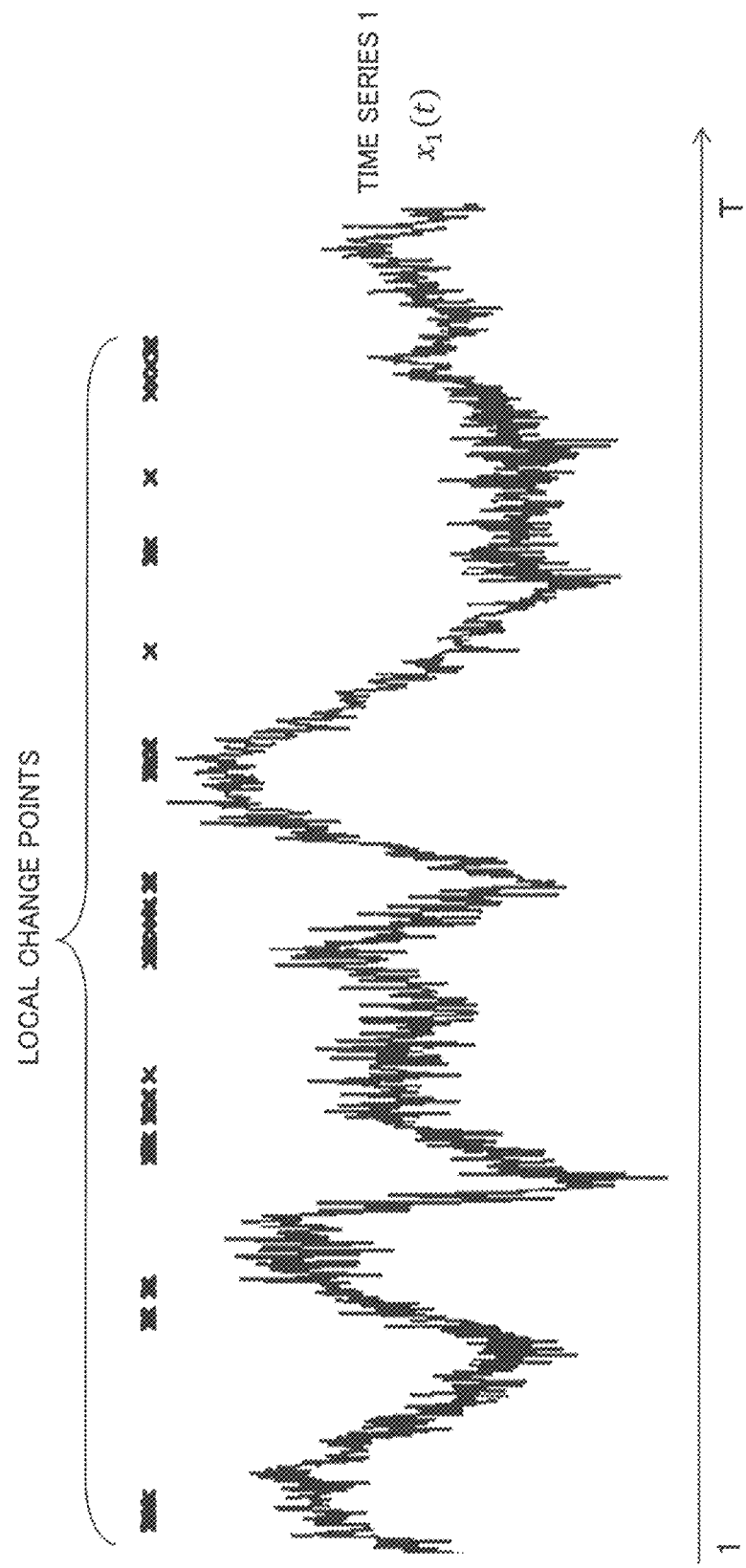
FIG. 7 is a diagram illustrating an example of detection of local change points in the example of the first example embodiment of the present invention.

The local change point search unit 1031, with respect to each time series i, calculates absolute values $|\theta_{i,k} - \theta_{i,k-1}|$ of amounts of change between adjacent parameters for all of k=2 to n+1. The local change point search unit 1031 detects $t_k$ at which the absolute value(s) exceed(s) a predetermined threshold value as a local change point(s) of the time series i. FIG. 7 is a diagram illustrating a detection example of local change points (indicated by marks of "x" in FIG. 7) for the time series 1 illustrated in FIG. 6, by the local change point search unit 1031 in the example of the first example embodiment of the present invention.

After the local change point search unit 1031 has detected local change points with respect to all the time series 1 to N, the global change point search unit 1032 detects a global change point(s). Specifically, the global change point search unit 1032, on the basis of a distribution of these local change points, detects a time point(s) that locally maximize(s) the density of the distribution of local change points as a global change point(s) using, for example, a well-known method referred to as mean shift.

Figure 8:
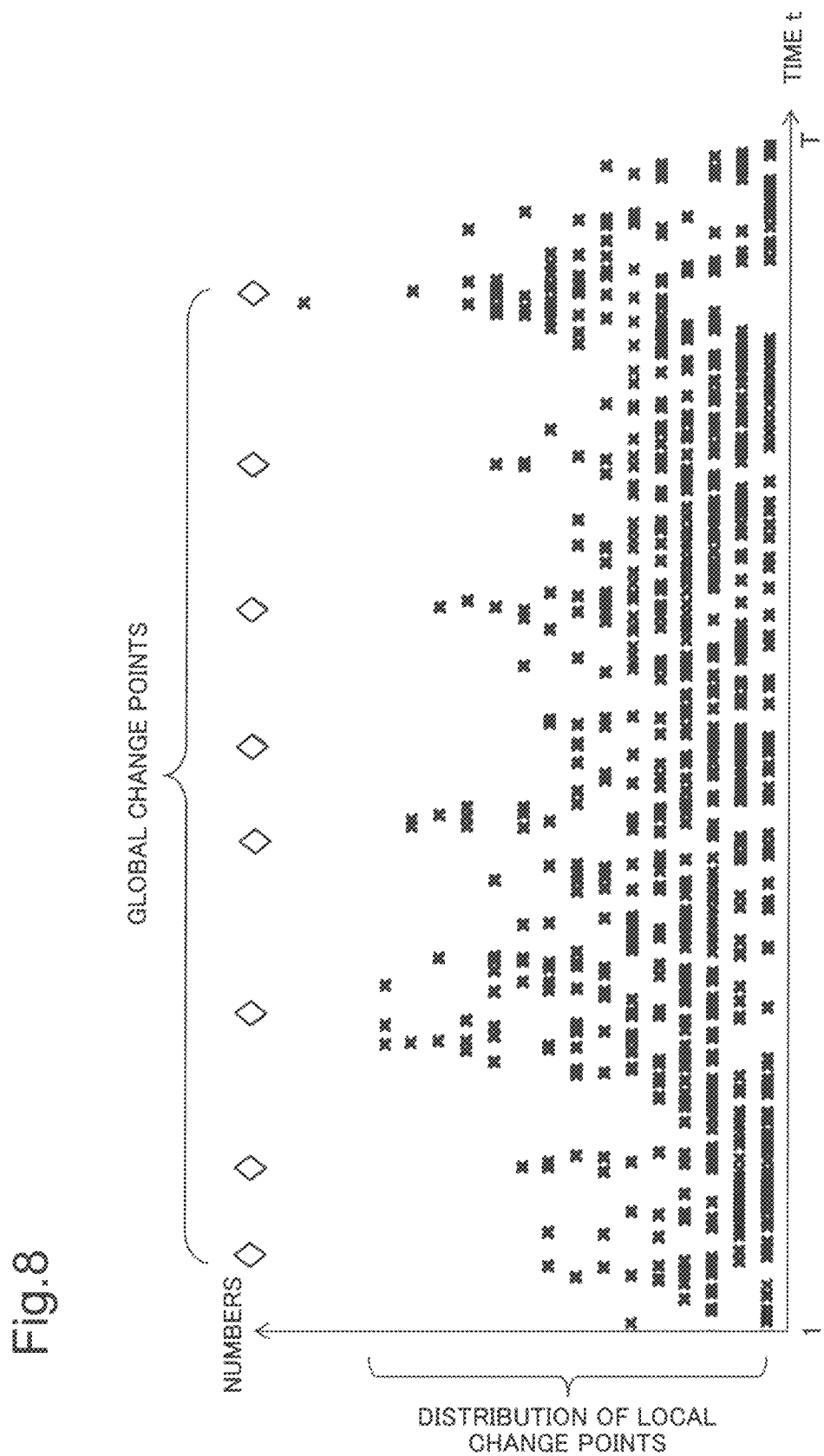
FIG. 8 is a diagram illustrating an example of a distribution of local change points and detection of global change points of time series in the example of the first example embodiment of the present invention.

FIG. 8 is a diagram illustrating an example of a distribution of local change points of time series and detection of global change points by the global change point search unit 1032 using mean shift with respect to the local change points in the example of the first example embodiment of the present invention. In FIG. 8, marks of "x" indicates local change points and marks of "0" indicates global change points. In FIG. 8, a distribution of local change points of all the time series (marks of "x") and a detection example of global change points (marks of "0") using mean shift with respect to the local change points are illustrated.

The change point output unit 104 outputs the global change point(s) to the change point display device 120. The change point display device 120, for example, displays the global change point(s) as a numerical value(s). The change point display device 120 may also display the global change point(s) not only as a numerical value(s) but also as a graph in conjunction with a portion or all of the time series.

Furthermore, the change point display device 120 may display, for each global change point, how and which time series has contributed to the change at the global change point. In other words, the change point display device 120 may display information indicating how and which time series causes the change point candidates to be detected as a global change point(s) in conjunction with the global change point(s).

Consequently, the change point detection system 401 in the example finishes the processing.

Figure 9:
FIG. 9 is a diagram illustrating an example of a global change point list 821 in the example of the first example embodiment of the present invention.
Figure 10:
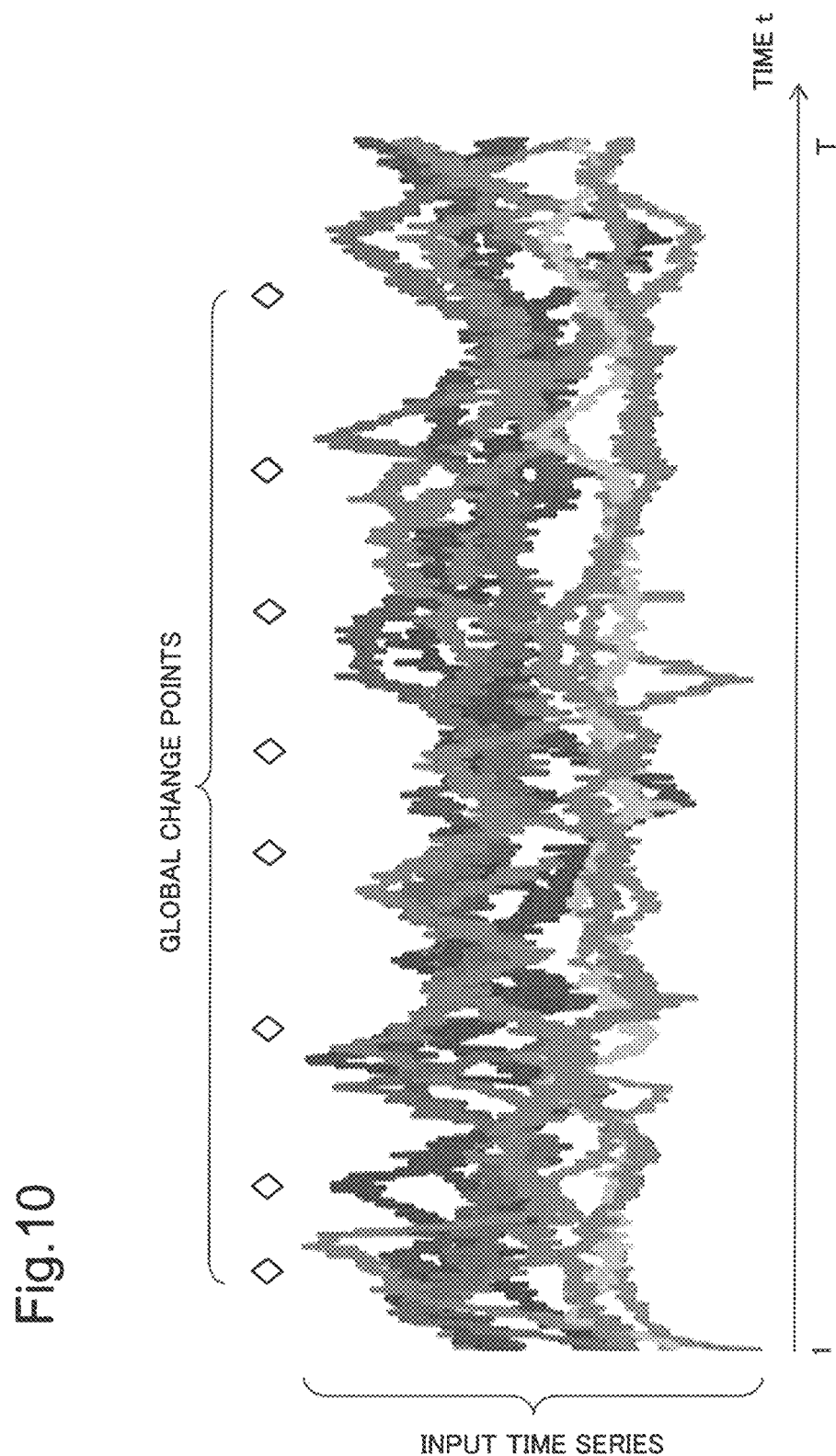
FIG. 10 is a diagram illustrating an example of a graph in which global change points are displayed in conjunction with time series in the example of the first example embodiment of the present invention.

FIGS. 9 and 10 are diagrams illustrating examples of display of global change points of the time series by the change point display device 120 in the example of the first example embodiment of the present invention.

FIG. 9 is a diagram illustrating an example of a global change point list 821 that is output by the change point output unit 104 and is displayed by the change point display device 120 when it is assumed that T (the number of time points=the number of change point candidates)=1000.

Furthermore, the change point display device 120 may output the position(s) of detected global change point(s) in conjunction with actual time series. FIG. 10 is a diagram illustrating an example of a graph in which global change points are displayed in conjunction with time series. The results illustrated in FIGS. 9 and 10, or the like are results that are finally obtained by the change point detection system 401 in the example.

As is evident from FIG. 10, change points are detected as global change points in both a case in which a plurality of time series change (for example, a mark of "◇" indicating the third global change point from the left in FIG. 10) and a case in which only a specific time series changes substantially (for example, a mark of "◇" indicating the second global change point from the left in FIG. 10).

As described in the above results, the change point detection system 401 in the example is able to detect both a time point at which some of the time series change substantially and a time point at which a plurality of time series change simultaneously as change points.

An advantageous effect in the above-described example resides in that, when change points of the whole of a plurality of time series are detected, both a time point at which some of the time series change substantially and a time point at which most time series change may be detected as change points.

That is because the change point detection system 401 has a configuration described below. In the learning process of time series models, first, the first penalty term setting unit 10221 sets the first penalty term expressed by Math. 4. That is, because of the first penalty term, when, even if limited to some of the time series, change in the parameters $\theta_{i,k}$ of such time series is substantial, parameters $\theta_{i,k}$ that cause such large amounts of change are chosen. Second, the second penalty term setting unit 10222 sets the second penalty term expressed by Math. 5. That is, because of the second penalty term, when a plurality of time series change at the same change point candidate(s), parameters $\theta_{i,k}$ that cause large amounts of change in the same manner are chosen as the parameters $\theta_{i,k}$.

Second Example Embodiment

Next, a second example embodiment of the present invention will be described in detail with reference to the drawings. Hereinafter, unless the description of the present example embodiment is obscured, descriptions of portions overlapping the earlier description will be omitted. The second example embodiment of the present invention is an example embodiment that is made up of an essential portion of the present invention.

Figure 11:
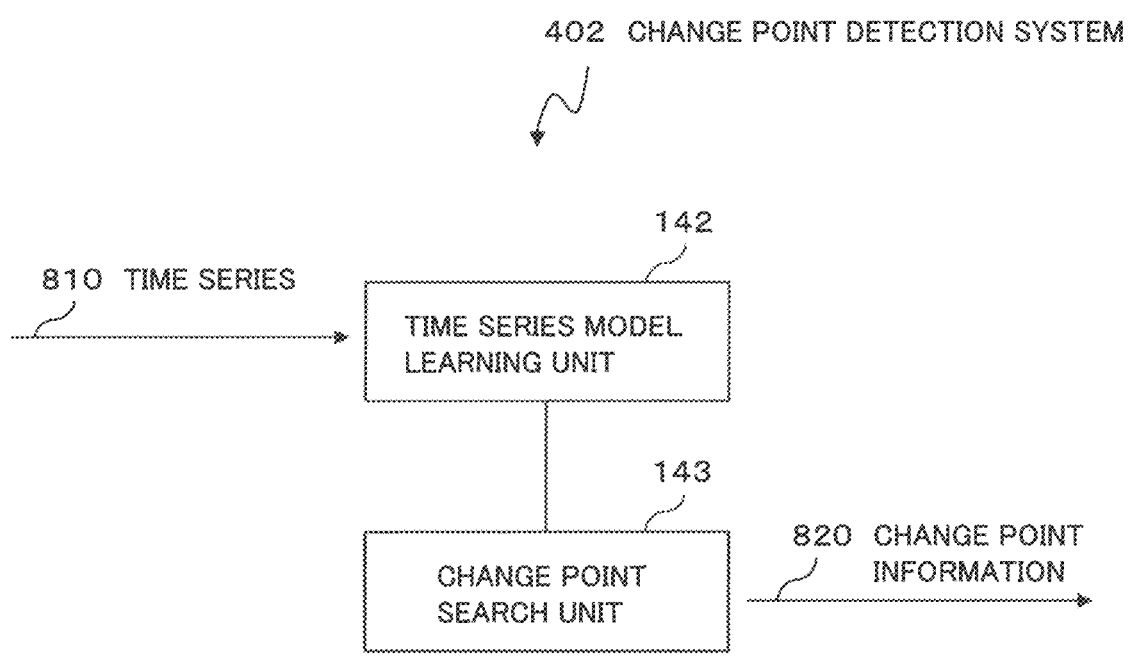
FIG. 11 is a block diagram illustrating a configuration of a change point detection system 402 in a second example embodiment of the present invention.

FIG. 11 is a block diagram illustrating a configuration of a change point detection system 402 in the second example embodiment of the present invention. As illustrated in FIG. 11, the change point detection system 402 includes a time series model learning unit 142 and a change point search unit 143.

===Time Series Model Learning Unit 142===

The time series model learning unit 142 learns models with respect to each of a plurality of time series 810. The models respectively approximate partial time series obtained by dividing a corresponding time series into a plurality of segments at change point candidates $t_1, t_2, \ldots,$ and $t_n$. The models are defined by parameters $\theta_{i,k}$ of the partial time series respectively. For example, the time series model learning unit 142 includes a loss function setting unit 1021, a first penalty term setting unit 10221, and a second penalty term setting unit 10222 that are illustrated in FIG. 1.

The time series model learning unit 142 may include functions performed by an observation data collection unit 101 that is illustrated in FIG. 1.

===Change Point Search Unit 143===

The change point search unit 143, with respect to each of change point candidates $t_k$ for the above-described plurality of time series 810, calculates a difference between a parameter $\theta_{i,k}$ of a first partial time series that starts from a time point indicated by a change point candidate $t_k$ and another specific parameter $\theta_{i,k}$. In the above, the another specific parameter $\theta_{i,k}$ is a parameter $\theta_{i,k}$ of a second partial time series before the time point indicated by the change point candidate $t_k$ (for example, a partial time series of the previous time segment or partial time series of a time segment preceding by a predetermined number). Next, the change point search unit 143, on the basis of the calculated difference, detects a change point for the plurality of time series 810 out of the change point candidates $t_k$. Next, the change point search unit 143 outputs change point information 820 indicating change points (for example, a global change point list 821 illustrated in FIG. 9 or a graph illustrated in FIG. 10 in which the time series 810 and global change points are illustrated in an associated manner). For example, the change point search unit 143 includes a local change point search unit 1031 and a global change point search unit 1032.

The change point search unit 143 may include functions performed by a change point output unit 104 illustrated in FIG. 1.

By including the above-described configuration, the change point detection system 402 can detect, as change points, both a time point at which some of the plurality of time series 810 change more largely than a specific criterion and a time point at which a greater number of time series 810 than a specific criterion change.

The time series model learning unit 142 may use, as a first penalty term, the absolute value sum (L1 norm) of the respective elements in vectors made up of amounts of change in parameters $\theta_{i,k}$.

By including the above-described configuration, the change point search unit 143 can detect a time point at which one time series 810 changes more largely than a specific criterion as a local change point.

The second penalty term setting unit 10222 may use, as a second penalty term, the sum, taken over all the change point candidates, of the square roots of the square sums (L2 norm) of the respective elements in a vector in which changes at respective change point candidates are arranged with respect to all the time series 810.

By including the above-described configuration, the change point search unit 143 can detect a time point at which the plurality of time series 810 change as a local change point of each time series 810.

When, at each change point candidate, an amount of the change in a parameter $\theta_{i,k}$ exceeds a predetermined threshold value, the change point search unit 143 may detect the change point candidate as a local change point.

By including the above-described configuration, the change point search unit 143 can detect, when a parameter $\theta_{i,k}$ changes at a change point candidate, the change point candidate as a local change point.

The change point search unit 143 may detect a global change point(s) from a distribution of local change points of all the time series 810 using mean shift.

By including the above-described configuration, the change point search unit 143 can detect a time point(s) at which the distribution of local change points takes a local maximum (maxima) as a global change point(s).

The time series model learning unit 142 may use an alternating direction method of multipliers as an optimization algorithm.

The time series model learning unit 142 may use a constant as a time series model approximating a partial time series. The time series model learning unit 142 may also use a straight line as a time series model approximating a partial time series.

The time series model learning unit 142 may still also use a polynomial as a time series model approximating a partial time series.

The time series model learning unit 142 may still also use an auto regressive model as a time series model approximating a partial time series.

The change point detection system 402 may, as with the change point detection system 400, be achieved by the computer 700, illustrated in FIG. 3.

In this case, the CPU 701 executes various processing in accordance with a read-out program and on the basis of read-out data as the time series model learning unit 142 and the change point search unit 143, illustrated in FIG. 11.

The storage unit 702 may be included in the time series model learning unit 142 and the change point search unit 143 as a portion thereof. For example, the storage unit 702 may, as a portion of the time series model learning unit 142, store data that are retained in the time series storage unit 111 and the time series model storage unit 112, illustrated in FIG. 1. The storage unit 702 may also, as a portion of the change point search unit 143, store data that are retained in the change point storage unit 113.

The storage device 703 may be included in the time series model learning unit 142 and the change point search unit 143 as a portion thereof. For example, the storage device 703 may, as a portion of the time series model learning unit 142, store data that are retained in the time series storage unit 111 and the time series model storage unit 112, illustrated in FIG. 1. The storage device 703 may, as a portion of the change point search unit 143, store data that are retained in the change point storage unit 113.

The input unit 704 may be included in the time series model learning unit 142 and the change point search unit 143 as a portion thereof. For example, the input unit 704 may, as a portion of the time series model learning unit 142 and the change point search unit 143, accept instructions relating to execution of processing and output of the change point information 820 from an operator.

The output unit 705 may be included in the time series model learning unit 142 and the change point search unit 143 as a portion thereof. For example, the output unit 705 may, as a portion of the time series model learning unit 142 and the change point search unit 143, display information relating to execution of processing and the change point information 820.

The communication unit 706 may be included in the time series model learning unit 142 and the change point search unit 143 as a portion thereof. For example, the communication unit 706 may, as a portion of the time series model learning unit 142, collect observation data from the outside. The communication unit 706 may also, as a portion of the change point search unit 143, transmit the change point information 820 to the outside.

Variation of Second Example Embodiment

FIG. 12 is a block diagram illustrating a configuration of a change point detection system 403 that is a variation of the second example embodiment of the present invention. As illustrated in FIG. 12, the change point detection system 403 includes a time series model learning unit 142, a change point search unit 143, a terminal 902, and a storage device 903. The time series model learning unit 142, the change point search unit 143, the terminal 902, and the storage device 903 are interconnected via a network 901. Any given combination of the time series model learning unit 142, the change point search unit 143, the terminal 902, and the storage device 903 may be a single computer 700, as illustrated in FIG. 3. In the change point detection system 403, any ones of the time series model learning unit 142, the change point search unit 143, the terminal 902, and the storage device 903 may be directly connected to each other without interposing a network. That is, the time series model learning unit 142, the change point search unit 143, the terminal 902, and the storage device 903 may be optionally interconnected via the network 901.

===Time Series Model Learning Unit 142===

The time series model learning unit 142 is equivalent to the time series model learning unit 142 illustrated in FIG. 11.

===Change Point Search Unit 143===

The change point search unit 143 is equivalent to the change point search unit 143 illustrated in FIG. 11.

===Terminal 902===

The terminal 902 includes the functions of the change point display device 120 illustrated in FIG. 5.

===Storage Device 903===

The storage device 903 includes the functions of the storage device 110 illustrated in FIG. 5.

An advantageous effect of the above-described variation in the second example embodiment of the present invention resides in that construction of the change point detection system 403 may be achieved flexibly.

That is because the time series model learning unit 142, the change point search unit 143, the terminal 902, and the storage device 903 are optionally interconnected via the network 901.

Respective constituent elements described in the respective example embodiments do not necessarily have to be individually independent entities. For example, an arbitrary number of constituent elements may be achieved in a single module. Any one out of the constituent elements may be achieved by a plurality of modules. Any one out of the constituent elements may be any other one out of the constituent elements. A portion of any one out of the constituent elements may overlap a portion of any other one out of the constituent elements.

The respective constituent elements and the modules achieving the respective constituent elements in the respective example embodiments described thus far may, if possible, be achieved in hardware as needed basis. The respective constituent elements and the modules achieving the respective constituent elements may also be achieved by a computer and programs. The respective constituent elements and the modules achieving the respective constituent elements may also be achieved by a mixture of modules configured in hardware, and a computer and programs.

Programs are recorded in a computer-readable non-transitory recording medium, such as a magnetic disk and a semiconductor memory, and provided to the computer. The programs are read from the non-transitory recording medium into a computer at the start-up of the computer or the like. The read programs control operations of the computer to make the computer function as the constituent elements in the respective example embodiments described afore.

Although, in the respective example embodiments described thus far, a plurality of operations are described in order in a flowchart form, the description sequence does not restrict the execution sequence of the plurality of operations. Therefore, when the respective example embodiments are embodied, the execution sequence of the plurality of operations may be changed within a range of not affecting the results of the operations.

In addition, in the respective example embodiments described thus far, a plurality of operations are not limited to being executed at timings differing from one another. For example, during execution of an operation, another operation may be executed. The execution timings of an operation and another operation may overlap each other partially or completely.

Furthermore, although, in the respective example embodiments described thus far, it is described that an operation becomes a triggering event for another operation, the description does not restrict the relation between the operation and the another operation. Thus, when the respective example embodiments are embodied, the relations among the plurality of operations may be changed within a range of not affecting the results of the operations. The specific descriptions of the respective operations of the respective constituent elements do not restrict the respective operations of the respective constituent elements. For this reason, the specific operations of the respective constituent elements may be changed within a range of not affecting functional, performance-related, and other characteristics in embodying the respective example embodiments.

While the present invention has been particularly shown and described with reference to example embodiments thereof, the present invention is not limited to the embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-001270, filed on Jan. 7, 2015, the disclosure of which is incorporated herein in its entirety by reference.

REFERENCE SIGNS LIST

100 Central processing device
101 Observation data collection unit

102 Time series model learning unit
1021 Loss function setting unit
1022 Penalty term setting unit
10221 First penalty term setting unit
10222 Second penalty term setting unit
103 Change point search unit
1031 Local change point search unit
1032 Global change point search unit
104 Change point output unit
110 Storage device
111 Time series storage unit
112 Time series model storage unit
113 Change point storage unit
1131 Local change point storage unit
1132 Global change point storage unit
120 Change point display device
142 Time series model learning unit
143 Change point search unit
200 Analyzed device
201 Sensor
400 Change point detection system
401 Change point detection system
402 Change point detection system
403 Change point detection system
700 Computer
701 CPU
702 Storage unit
703 Storage device
704 Input unit
705 Output unit
706 Communication unit
707 Recording medium
810 Time series
820 Change point information
821 Global change point list
901 Network
902 Terminal
903 Storage device

The invention claimed is:

1. An information processing system comprising:
a memory storing instructions, and
one or more processors configured to execute the instructions to:
learn, with respect to each of a plurality of time series, models that approximate partial time series respectively and that are defined by parameters of the partial time series respectively, the partial time series being obtained by dividing a corresponding time series into a plurality of segments at change point candidates;
calculate, with respect to each of the change point candidates for the plurality of time series, a difference between a parameter of a first partial time series starting from a time point of a corresponding change point candidate and a parameter of a second partial time series before the corresponding change point candidate;
extract change point candidates for which the calculated difference exceeds a predetermined threshold as local change points;
detect a global change point that is a change point for the plurality of time series based on a distribution of the extracted local change points; and
output the global change point.

2. The information processing system according to claim 1, wherein
the one or more processors is further configured to execute the instructions to:
set a loss function with respect to approximate values for values of a time series, the approximate values being calculated based on the parameters; and
set a first penalty term whose value increases as an amount of change in the parameters of a single time series out of the plurality of time series increases and a second penalty term whose value decreases as a number of the plurality of time series whose parameters change at a predetermined time increases out of the plurality of time series, and
parameters that minimize a sum of the loss function, the first penalty term, and the second penalty term for respective partial time series of all time series in the plurality of time series are calculated by using an optimization algorithm.

3. The information processing system according to claim 2, wherein the one or more processors are further configured to execute the instructions to:
set, as the first penalty term, an absolute value sum of amounts of change in parameters at the respective change point candidates.

4. The information processing system according to claim 2, wherein the one or more processors are further configured to execute the instructions to:
set, as the second penalty term, a square root of a square sum of amounts of change in parameters at the respective change point candidates, the square sum being taken over all time series is set.

5. The information processing system according to claim 2, wherein the one or more processors are further configured to execute the instructions to:
use, as the optimization algorithm, an alternating direction method of multiplies.

6. The information processing system according to claim 1, wherein the one or more processors are further configured to execute the instructions to:
output, with respect to the global change point, information indicating how and which time series causes a change point candidate to be detected as the global change point.

7. The information processing system according to claim 1, wherein the one or more processors are further configured to execute the instructions to: detect, as the global change point, a time point that locally maximizes a density of the distribution of the extracted local change points.

8. The information processing system according to claim 1, wherein the one or more processors are further configured to execute the instructions to: output the global change point to a display device that displays a graph indicating the global change point with the plurality of time series.

9. A change point detection method performed by a computer comprising:
learning, with respect to each of a plurality of time series, models that approximate partial time series respectively and that are defined by parameters of the partial time series respectively, the partial time series being obtained by dividing a corresponding time series into a plurality of segments at change point candidates;
calculating, with respect to each of the change point candidates for the plurality of time series, a difference between a parameter of a first partial time series starting from a time point of a corresponding change point candidate and a parameter of a second partial time series before the corresponding change point candidate;

extracting change point candidates for which the calculated difference exceeds a predetermined threshold as local change points;

detecting a global change point that is a change point for the plurality of time series based on a distribution of the extracted local change points; and outputting the global change point.

10. A non-transitory computer readable storage medium recording thereon a program causing a computer to perform a method comprising:

learning, with respect to each of a plurality of time series, models that approximate partial time series respectively and that are defined by parameters of the partial time series respectively, the partial time series being obtained by dividing a corresponding time series into a plurality of segments at change point candidates;

calculating, with respect to each of the change point candidates for the plurality of time series, a difference between a parameter of a first partial time series starting from a time point of a corresponding change point candidate and a parameter of a second partial time series before the corresponding change point candidate;

extracting change point candidates for which the calculated difference exceeds a predetermined threshold as local change points;

detecting a global change point that is a change point for the plurality of time series based on a distribution of the extracted local change points; and outputting the global change point.

* * * * *